UNITED STATES PATENT OFFICE.

JOHN CHRISTOPHEL, OF ST. LOUIS, MISSOURI.

BITTERS.

SPECIFICATION forming part of Letters Patent No. 229,804, dated July 13, 1880.

Application filed March 3, 1880. (No specimens.)

*To all whom it may concern:*

Be it known that I, JOHN CHRISTOPHEL, of St. Louis, and State of Missouri, have invented certain Improvements in Compositions for Bitters, (Walnut,) of which the following is a specification.

This invention relates to a certain composition of ingredients for the purpose of forming a compound to be called "walnut-bitters."

The principal ingredients upon which the medicinal value consists are walnuts and the essence of the same, whortleberries, and wormwood and liquor, as these three assist the walnuts and essence of the walnuts in their operation upon the system in cases of malaria and diseases incident thereto. The effect of the combination of these three with the essence of walnut is to reduce its strength, all of which will be described as follows: To one barrel containing thirty-five (35) gallons, a half-bushel of black walnuts in a green state sliced, five gallons of bitter essence of walnuts, twenty-five gallons of best whisky, five gallons of pure water, ten pounds of clarified sugar, two pounds of *Wermuth*, (wormwood,) two pounds of *Heidelbeere*, (whortleberry,) ten nutmegs very coarsely ground, two ounces cloves, (natural,) ten medium-sized red-pepper pods, one-quarter of a pound of coriander-seed, and the peelings from twelve oranges. This compound is to be subjected to 100° Fahrenheit, and to remain thus for one month, to allow all the infusion to take place. These materials are kept in the barrel or suitable vessel. After this the mixture will be ready for use.

What I claim as my invention, and desire to secure by Letters Patent, is—

The composition for walnut-bitters above described, consisting of the following ingredients, viz., sliced green black walnuts, bitter essence of walnuts, the best whisky, clarified sugar, wormwood, whortleberry, nutmegs, cloves, red-pepper pods, orange-peel, and pure water, in the proportions substantially as described.

JOHN CHRISTOPHEL.

Witnesses:
ELIAS P. CHRISTOPHEL,
HENRY CHRISTOPHEL.